(12) United States Patent
Schneider et al.

(10) Patent No.: US 7,512,936 B2
(45) Date of Patent: Mar. 31, 2009

(54) CODE DIVERSIFICATION

(75) Inventors: Manfred Schneider, Nussloch (DE); Eugene Sindambiwe, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 712 days.

(21) Appl. No.: 11/016,433

(22) Filed: Dec. 17, 2004

(65) Prior Publication Data
US 2006/0136867 A1 Jun. 22, 2006

(51) Int. Cl.
G06F 9/45 (2006.01)

(52) U.S. Cl. .................. 717/136; 711/165; 704/8; 707/104.1; 717/146

(58) Field of Classification Search ........... 717/106, 717/136
See application file for complete search history.

(56) References Cited

U.S. PATENT DOCUMENTS

| | | | |
|---|---|---|---|
| 6,473,897 B1 * | 10/2002 | Ansari et al. ............... 717/136 |
| 7,107,285 B2 * | 9/2006 | von Kaenel et al. ...... 707/104.1 |
| 7,197,748 B2 * | 3/2007 | Chaiken et al. ............. 717/146 |
| 7,225,309 B2 * | 5/2007 | DeWitt et al. ............... 711/165 |
| 7,447,624 B2 * | 11/2008 | Fuhrmann ...................... 704/8 |
| 2005/0081181 A1 * | 4/2005 | Brokenshire et al. ........ 717/100 |

* cited by examiner

*Primary Examiner*—Wei Y Zhen
*Assistant Examiner*—Phillip H Nguyen
(74) *Attorney, Agent, or Firm*—Fish & Richardson P.C.

(57) ABSTRACT

Methods and apparatus, including computer systems and program products, that relate to diversification of computer code. The methods feature a machine-implemented method that includes receiving input computer code, and automatically generating multiple versions of diversified computer code, where each version of the diversified computer code is distinct from but functionally equivalent to the input computer code. The input computer code can include source code or binary code and automatically generating multiple versions of diversified computer code can include automatically generating multiple versions of diversified source and/or binary code. Automatically generating diversified computer code can include applying multiple diversification operations.

18 Claims, 2 Drawing Sheets

CODE DIVERSIFICATION

BACKGROUND

The following specification relates to diversification of computer code.

Many computers in the world are connected together such that they can interact and exchange many different types of data. They can be connected by a wired or wireless network of any topology and in a manner involving some or no intermediary actors. The popularity of the World Wide Web (WWW) and email exchanges demonstrate that computer interaction is intensively exploited.

As the interaction among diverse computer systems has increased, computer security can be considered more and more of an issue. The interconnectivity provided by global networks can make many computers, in different parts of the world, a potential target of a security threat (e.g., propagation of security attacks like, e.g., Trojan horses).

SUMMARY

Described herein are methods and apparatus, including computer program products, that relate to diversification of computer code.

In one general aspect, the methods feature a machine-implemented method of generating multiple versions of computer code. That method includes receiving input computer code, and automatically generating multiple versions of diversified computer code where each version of the diversified computer code is distinct from but functionally equivalent to the input computer code.

Implementations can include one or more of the following features. The input computer code can include source code and automatically generating multiple versions of diversified computer code can include automatically generating multiple versions of diversified source code. The input computer code can include binary code and automatically generating multiple versions of diversified computer code can include generating automatically multiple versions of diversified binary code. Automatically generating diversified computer code can include identifying one or more jump destinations in the input computer code and revising the jump destinations based on one or more diversification operations. Automatically generating diversified computer code can include applying multiple diversification operations. The diversification operations can include one or more of inserting non-functional code; inserting duplicate code (e.g., duplicates of assignment operations), where the duplicate code duplicates operations specified in the input computer code; renaming labels; and inlining computer code (e.g., making a module of computer code accessible by a function such that the computer code is functionally equivalent). Automatically generating diversified computer code can further include identifying multiple locations in the input computer code such that multiple diversification operations are applied to one or more of the multiple locations. Automatically generating diversified computer code can include using a random function to select which of the multiple diversification operations to apply. The method can further include receiving user input and using the user input as a seed for the random function. Automatically generating diversified computer code can include using a random function to select at which of multiple locations to apply a diversification operation. Automatically generating diversified computer code can include, for each version of diversified code, storing information about the multiple diversification operations performed. The method can further include generating a patch for a version of the diversified computer code using the information about the multiple diversification operations performed and patching a version of the diversified computer code with the patch.

In another aspect of the disclosure, apparatus feature a computer program product, stored on a machine-readable medium, that includes instructions operable to cause a data processing apparatus to receive input computer code, and automatically generate multiple versions of diversified computer code such that each version of the diversified computer code is distinct from but functionally equivalent to the input computer code.

Implementations can include one or more of the following features. The instructions operable to automatically generate diversified computer code can include instructions operable to apply multiple diversification operations. The instructions operable to automatically generate diversified computer code can further include instructions operable to identify multiple locations in the input computer code. The method can include applying the multiple diversification operations to one or more of the multiple locations. The instructions operable to automatically generate diversified computer code can include instructions operable to use a random function to select one or more of the multiple diversification operations to apply. The instructions operable to automatically generate diversified computer code can include instructions operable to, for each version of diversified code, store information about the multiple diversification operations performed. The computer program product can further include instructions operable to generate a patch for a version of the diversified computer code using the information about the multiple diversification operations performed and patch a version of the diversified computer code with the patch.

In another aspect of the disclosure, the apparatus feature a code diversifier configured to perform tasks including receiving input computer code and automatically generating multiple versions of diversified computer code, where each version of the diversified computer code is distinct from but functionally equivalent to the input computer code.

Implementations can include one or more of the following features. The task of automatically generating diversified computer code can include applying multiple diversification operations. The task of automatically generating multiple versions of diversified computer code can include generating multiple versions of diversified computer code such that diversification operations are randomly performed on each version.

The mechanisms and techniques described here may provide one or more of the following advantages. Multiple versions of computer code can be generated automatically from a single version of computer code. The code can be functionally similar (or identical) such that an end-user does not notice any difference in the operation of the software that includes the code (e.g., the same user interfaces can be presented and the software can behave the same).

Addition of non-functional diversity to functional homogeneity can reduce the likelihood of security attack successes. For example, if 1,000 different versions of a software product are made and a security attack (e.g., a virus) is only designed for one version of that software product, the security attack that targets the software product could be unsuccessful at attacking any versions of the software product other than the version of the software product for which the security attack was designed.

In general, the price of developing the same functionality multiple times seems to be very high, were humans to generate diverse code. Because of the reduced price of having a machine-implemented code diversifier, it can be possible to economically generate multiple versions of a software product. In addition, the binary code can be manipulated instead of, or in addition to, the source code, as the task of manipulating binary code is difficult for a human to perform manually. In addition, because many different versions can be created automatically, targeting all of them at once can become too expensive for potential computer attackers.

The approach of diversifying code advantageously does not introduce computer network islands, or other changes to a network structure.

Information about the differences of each version of the code can be saved such that patches can be reliably developed as a single patch and the patches can be automatically adjusted for each version of the code such that a patch applies properly.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

Figure 1:
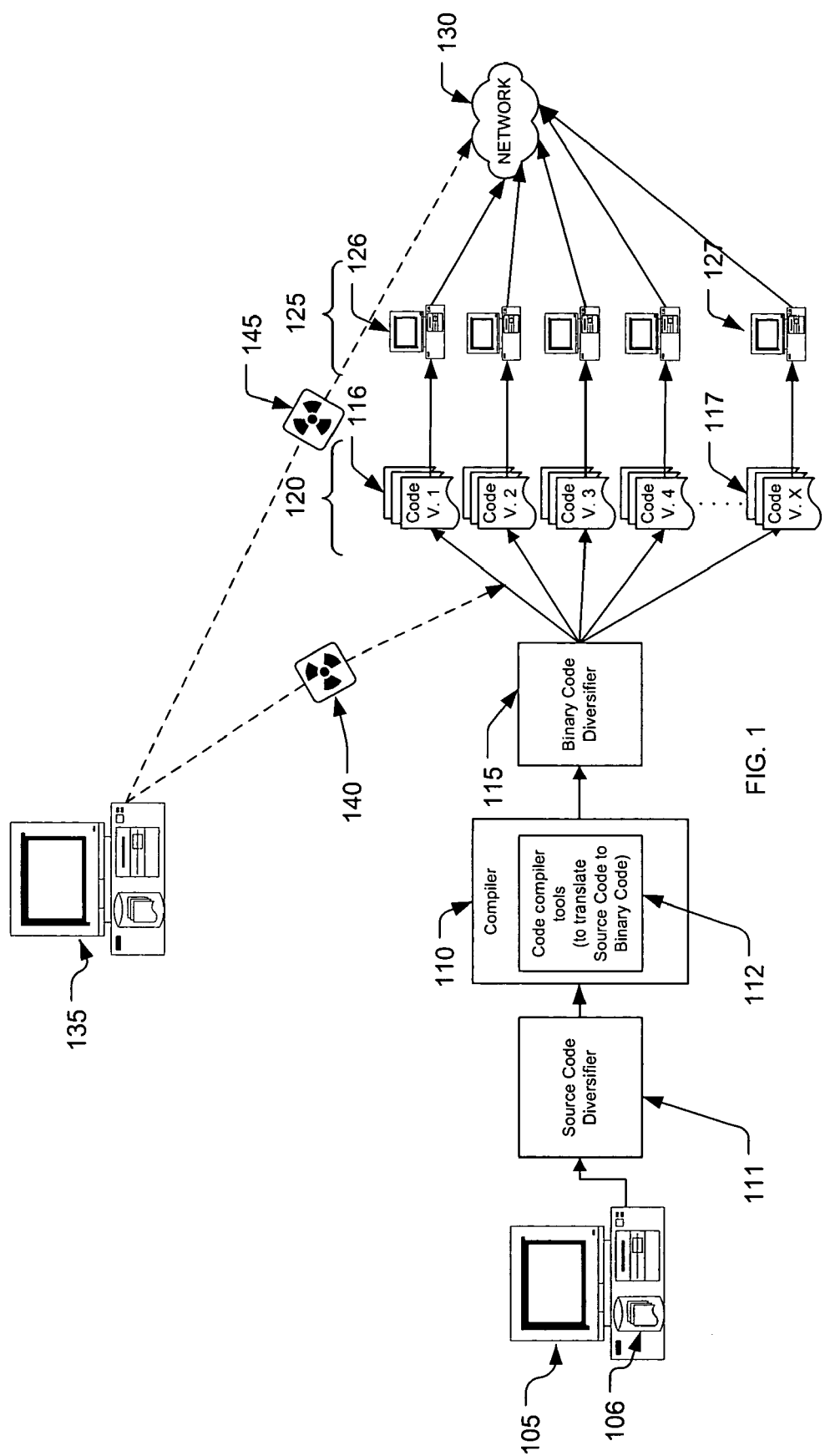
FIG. 1 is an illustration of code diversification and attacks on diverse code.

FIG. 1 is an illustration of code diversification and security attacks on diverse code. FIG. 1 includes a programmer-user computer 105, a source code diversifier 111, a compiler 110, a binary code diversifier 115, multiple versions of code 120, end-user computers 125, a network 130, and a security attack distributing computer 135. In general, the programmer-user computer 105 is used to generate source code and send the source code to the source code diversifier 111. The source code diversifier interacts with the compiler 110 to deliver diverse versions of source code to the compiler 110 and the compiler 110 compiles the code. Binary code from the compiler 110 is diversified at a binary code diversifier 115, and multiple versions of code 120 can be generated. The multiple versions of code can be run on end-user computers 125, each of which can have access to the network 130. The security attack distributing computer 135 distributes attacks 140 and 145 to a version of the binary code 116 that is distributed to end-users computers 120 and to the network 130, where versions of the binary code that are resident on end-user computers 120 can be reached.

The programmer-user computer 105, which is used to generate source code, can include a development environment for the development of software. The development environment can include editors, such as a text editor, and compilers, such as the compiler 110. In addition the programmer-user computer can store and use the source and binary code diversifiers 111, 115. Software that is developed on the programmer-user computer can include, as examples, software products, components for software products (e.g., a plug-in), patches to software products, and the like. The source code can be written in different programming languages of different abstractions. As examples, the source code can be written in a high-level, object oriented language, such as C++; a high-level level function driven language, such as C; an assembly-level language, such as Motorola 68000 assembly; and the like. Source code generated on the programmer-user computer 105 can be stored on the storage device 106 for later retrieval and/or compilation.

Source code that is generated on the programmer-user computer 105 is received as input by the source code diversifier 111. The source code diversifier 111 performs diversification operations on source code to generate different versions of source code. The source code diversifier 111 generates one diverse version of source code each time code is to be compiled. In alternative implementations, the source code diversifier 111 need not be limited to generating one version of source code at a time. For example, in some implementations, the source code diversifier 111 can generate multiple, diverse versions of source code at substantially the same time.

The diversification operations modify source code such that a distinct version of the source code can be generated (than the version of source code received by the compiler 110) while maintaining the semantics of the source code (e.g., the code appears functionally equivalent to an end-user across different versions). The diversification operations can be performed randomly. As an example, the source code diversifier can parse and analyze source code to determine a location at which a specific diversification operation can be performed. Then, the source code diversifier can randomly determine whether to perform the diversification operation at that location. In some implementations, different patterns of input (e.g., different strings of numbers) can be received by the source code diversifier, and the source code diversifier can use those patterns to determine if a diversification operation should be performed. As another example, a random seed can be received and used for randomization. As another example, a code analyzer can be used to determine locations where different source code diversification operations can be performed and that data can be stored in a table. Then, that table and a specification of the types of diversification operations and where they should be performed can be received as input to a code diversifier. Then, the source code diversifier 111 can generate a diversified version of source code based on that input.

The diversification operations that are performed on source code by the source code diversifier 111 can include insertion of source code that does not affect functionality (e.g., similar to a no operation instruction in machine code, such as performing an addition operation without affecting the functionality of the program; note, depending on the type of source code, jumps and the like can be affected by the insertion of such code), renaming of source code (e.g., classes, variables, and the like; depending on the type of source code), insertion of redundancy (e.g., inserting duplicate code that performs the same functionality, such as exists in the example C++ code "int A=5; A=5;" and can further include checking the results of original code and duplicate code, where each produces results, to ensure that both the original and duplicate code yield the same result; e.g., duplicating certain operations that do not change the semantics of the code, such as assignment operations and checking them), generation of inline code (e.g., making module calls from corresponding code such that the code is functionally the same and can result in extra instructions at compile time), and insertion of robustness checks (many types of robustness checks can be predicted; e.g., adding a check for input before a division operation to ensure there is no dividing by zero). In alternative implementations additional and/or different diversification operations can be performed on source code.

Various approaches can be used to implement diversification operations. For example, to implement code redundancy, metadata could be included with source code and the metadata could assist a source code diversifier in diversifying the code (e.g., in a manner that might not otherwise be reliable without the metadata or might be too resource consumptive to compute while diversifying code). For example, metadata could be helpful for a code diversification technique that results in code redundancy. As an example, security sensitive functionality (e.g., functionality that should not be interfered with by a security attack) can be provided by two or more equivalent implementations of a function, such as a function F and a function G. If metadata that indicates the functions F and G are semantically equivalent is available as application metadata to the code diversifier, then a statement, such as $y=F(x)$, can be enhanced with a call of a semantic duplicate, e.g., $z=G(x)$ where z is a new variable, and then a check can be made to ensure the results are equivalent, e.g., a check to see if y is equal to z. As another example, a code diversifier could use metadata to determine which code can be interchanged. For example, a statement $y=F(x)$ can be replaced with $y=G(x)$ to create a diverse version of code, where metadata indicates that $F(x)$ and $G(x)$ are semantically equivalent.

Different techniques of code diversification could serve differing purposes. For example, a technique that inserts code redundancy could create a more robust version of software, whereas a technique that interchanges code modules could create versions of software that are robust against security attacks that target specific code modules (e.g., if a code module F is targeted by a security attack, F has a semantic equivalent G, and G is interchanged with F in a software program, the version of software with the code module G can be protected against the security attack).

A code diversifier can take special situations into account to ensure the functional equivalence of the diversified code. For example, when diversifying code, there is a risk that changes to the code can affect code that is dependent on, for example, that code's location. As another example, there is a risk that changing source code can affect the optimization of source code by a code-optimizer (e.g., a code optimizer in a compiler). As an example of how a code diversifier can take such special situations into account, if inserting a "no operation" instruction would misplace binary code such that a jump operation would reference an incorrect jump destination, a binary code diversifier can change the jump destination to account for the difference in location of a jump destination address caused by inserting the "no operation."

To perform diversification operations, the source code diversifier 111 reads and interprets source code. Depending on the diversification operation to be performed, there can be different degrees of intelligence and/or analysis used to interpret the source code (likewise for the binary code diversifier). As an example, interpretation could be very rudimentary if simple techniques and/or a simple language (a programming language or machine-code; e.g., adding "no operation" instructions might require little interpretation because they could be added in many places). As another example, interpreting source code can involve interpreting source code according to a language in which the source code program was written (e.g., an interpreter for C++ code), which can require the source code diversifier to understand the semantics of the langue to determine locations at which diversification operations can be performed without affecting the functionality.

The source code diversifier can interpret source code and perform diversification in different scopes of the source code (likewise for the binary code diversifier). As examples, the scopes can include loop-level diversification that is performed at the loop-level; local diversification that is performed at a procedure-level; global diversification that is performed with the help of an understanding of data flow analysis (e.g., following computations in a program to some degree and detecting the points at which variables get modified; information gathered in this way can be used to identify safe locations automatically) and split-lifetime analysis; and inter-procedural diversification.

Diversified source code from the source code diversifier 111 is received at the compiler 110. The compiler 110 transforms source code into binary code. More specifically, the code compiler tools 112, which are included in the compiler 110, translate the source code to binary code. Source code generally refers to code that can be interpreted easily by a human, such a high-level language programming code or assembly code. As used herein binary code need not be limited to machine-code (e.g., x86 Intel machine-code). For example, binary code also includes virtual machine-code (e.g., Java Bytecode). To translate source code to binary code, the code compiler tools 112 can include a reader that reads source code and stores actual text in memory using, e.g., linked lists; a lexicographical analyzer (a lexer) that converts read source code characters to a list of tokens by recognizing basic lexical elements, like numbers, strings or keywords; a syntax analyzer that read a token stream delivered by a lexicographical analyzer and builds a memory data structure, such as a parse tree, containing syntactically analyzed and built program; and a code generator (e.g., parse tree traverser) to transform the memory data structure into a program.

The source code diversifier 111 is linked to the compiler 110 such that it is called before the compiler; similarly to a pre-processor. Also, the compiler 110 is separate from the source code and byte code diversifiers 111, 115, such that the components can be interchanged. For example, the source code diversifier 111 can be used with compilers other than the compiler 110. This can, for example, offer flexibility such that vendors of the source code diversifier 111, binary code diversifier 115, or both, can sell their tools without having to develop compilers and users of the code diversifiers 111, 115 need not be restricted when choosing a compiler. In alternative implementations, the source code diversifier 111, the binary code diversifier 115, or both can be tightly integrated with the compiler 110. This could result in increased performance. As an example, the source code diversifier 111 can be integrated with the code compiler tools 112 such that code generation and source code diversification are part of the same process. For example, as a parse tree is being built, diversification operations can be performed to generate a diverse parse tree that is functionally equivalent to other parse trees that can be generated. In some implementations the source code diversifier 111 need not be linked to the compiler 110. For example, the source code diversifier 111 might not be linked with the compiler 110 such that the source code diversifier 111 can be used to generate multiple versions of source code serially and the compiler 110 can work on those multiple versions of source code independent of the source code diversifier 111 (e.g., in any order or at any time).

The binary code diversifier 115 generates diverse versions of binary code. Binary code, from the compiler 110, is received and used to generate diverse binary code. The binary code diversifier 115 can generate multiple versions of binary code at substantially the same time. The binary code diversifier 115 can generate diverse code using similar, different, fewer, and/or additional diversification operations as compared to the source code diversifier 111. As examples, the diversification operations that can be performed can include insertion of "no operation" (e.g., NOOP) instructions, inserting "no operation" (e.g., NOOP) modules; source code diversification, renaming of variables, resources, and the like; insertion of redundancy; and insertion of robustness checks. Alternatively, one distinct version of binary code can be generated at a time.

The binary and/or source code diversifiers 111, 115 can have different implementations depending on a type of programming language and/or machine-code for which the respective diversifier is designed. This can be a result of interpretation of the binary code or source code varying depending on the machine instructions or grammars used for binary code and source code, respectively. As an example, there can be a Motorola 68000 and a Java Bytecode diversifier. As another example, there can be a C++ and a FORTRAN source code diversifier.

The binary code diversifier 115 is linked to the compiler 110 such that it is called after the compiler similarly to a code optimizer (e.g., a byte code optimizer). Alternatively, the binary code diversifier 115 can be independent of the compiler 110. For example, the binary code diversifier 115 can reside at a distributor such that a distributor generates a different version of binary code for each product to be distributed (e.g., as part of a production process). For example, different versions can be generated prior to burning DVD-ROM discs that include a diverse version of the binary code. As another example, the code diversifier can be used during or right before download of a software product. As another example, the binary code diversifier can reside on a machine-readable medium that is distributed with a product and diverse binary code can be generated during the installation of a software product. Although the binary code diversifier 115 is shown as separate from the compiler 110, other implementations can vary. For example, the compiler 110 can include the binary code diversifier 115.

Information corresponding to the types of diversification operations performed (binary and/or source code diversification operations) and their locations can be stored for later retrieval. The information can be used such that only a single software patch need be developed and different versions of that software patch can be automatically generated based on the diversification information for a specific version of software. In that manner, software patches can be efficiently and reliably generated for many different versions of software.

Although in FIG. 1 both source code diversification and binary code diversification are performed to generate various versions of code, in alternative implementations there can exist only a source code diversifier or only a binary code diversifier.

The end-user computers 125 execute the diversified code 120. Each of the end-user computers 125 can execute a different version of the code, or a limited number of different versions can be produced such that several of the end-user computers 125 execute a same version of the diversified code 120. As an example, the first version of code 116 can correspond to a first end-user computer 126, and an Xth version of code 117 can correspond to an Mth end-user computer 127, where X and M are a same number.

The end-user computers 125 are susceptible to computer attacks from the network 130 and the diversified code 120. For example, the diversified code 120 can be attacked with a security attack at a distributor's computer such that, e.g., virus infected versions of the diversified code 120 are distributed to end-user computers 120. As another example, an electronic mail can be sent to the end-user computer 126 that includes a virus as an attachment. The end-user computers 125 can be susceptible to different types of security attacks, such as Trojan horse viruses, viruses that cause malicious execution (e.g., erase contents), viruses that reveal private information (e.g., credit card information and passwords), denial of service attacks, Distributed denial of service attacks, creation or use of backdoors, remote access attacks (e.g., an attack targeting the remote access layer of a computer resource), local access attacks, and the like.

The diversified code 120 reduces the likelihood that an attack from the security attack distributing computer is successful on the end-user computers 125. Many of the end-user computers 125 can have different versions of diversified code and a security attack can be generated for a specific version of the diversified code such that the security attack can be ineffective against distinct versions of diversified code that have code-level variations and are semantically identical.

Figure 2:
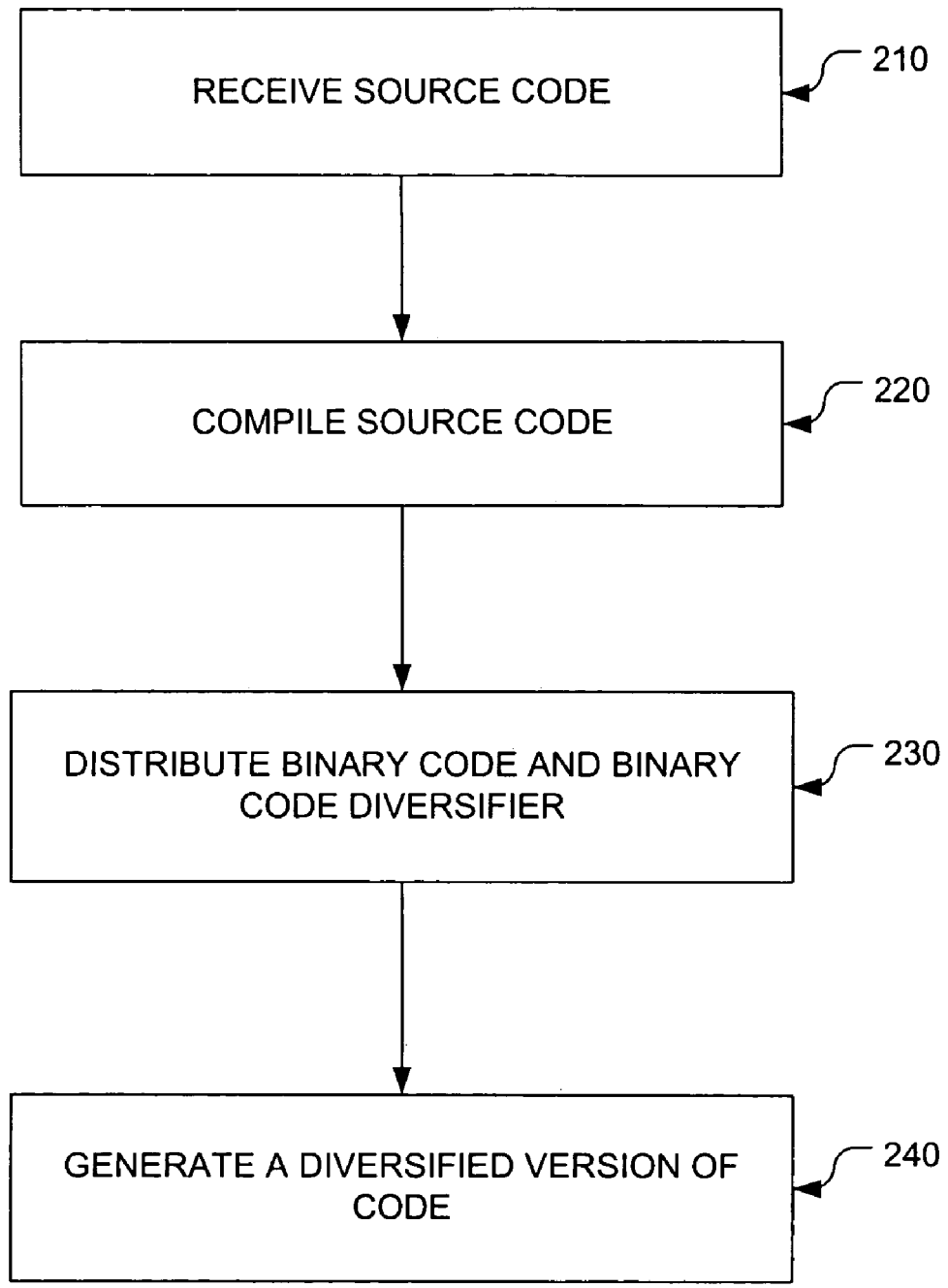
FIG. 2 is a flowchart of a sample process of distributing binary code and distributing a binary code diversifier to generate diversified code at an end-user computer.

FIG. 2 is a flowchart of a sample process of distributing binary code and distributing a binary code diversifier to generate diversified code at an end-user computer. In general, the process includes diversifying binary code and distributing the diversified code. The processes can be performed at one or more computing systems. For example, the processes can be performed at the user-programmer computer 105 of FIG. 1.

At 210, source code is received at a compiler. The compiler can include a software component that performs source code diversification. Or, the compiler can be separate from a source code diversifier, such as the compiler 110. The compiler compiles the source code to generate binary code at 220. The source code can be diversified source code.

The binary code and a binary code diversifier are distributed together at 230. The binary code and binary code diversifier can be distributed, for example, as part of a same DVD-ROM or part of a same download off of the Internet. Distributing the binary code with the binary code diversifier allows for the burden of generating diversified binary code to be pushed from a distributor to an end-user computer.

At 220, the binary code is diversified at an end-user computer. The binary code is diversified with the aid of the binary code diversifier. Diversifying binary code includes performing diversification operations on binary code. Similar diversification operations can be used for source code and binary code diversification (e.g., inserting non-functional source code for source code diversification and inserting NOOP instructions for binary code diversification). Diversifying binary code need not have any affect on the functionality of binary code such that the pre-diversified binary code and the diversified binary code appear the same to an end-user.

When diversifying code, because changes to the code can affect code that is dependent on, for example, that code's location, a code diversifier can make adjustments accordingly. For example, if a jump address would point to the wrong address if a "no operation" instruction were inserted into binary code, the jump address can be adjusted to correct the jump target address for the difference caused by the "no operation" instruction.

Generating multiple versions of computer code removes a sameness property of homogeneous software. Because of a seemingly increasing interconnected world and homogeneity of software, many computer systems appear susceptible to security attacks (e.g., viruses) that exploit a security flaw of a software product (e.g., an operating system). The diversification of code reduces the sameness property such that the effectiveness of a security attack that exploits a security flaw is reduced.

The source and binary code diversifiers can operate after a user-programmer has finished writing software such that a single programming interface need be used and only a single version of source code need be generated (e.g., there is a single "master" copy of the software). Thus, a programmer need only draft one version of code and can modify that one version of code to make improvements (e.g., remove bugs), and multiple versions of the same software can be automatically generated in an effort to protect the software from a potential security attack.

Although the sample process of FIG. 2 is shown as being composed of a certain number and type of processes, additional and/or different processes can be used instead. Similarly, the processes need not be performed in the order depicted. Thus, although a few implementations have been described in detail above, other modifications are possible. For example, in alternative implementations of the process of FIG. 2, source code can be diversified instead of, or in addition to, binary code.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network. Data for a computer program can be stored in a file.

As used herein, the term "document" (sometimes referred to as "electronic document") means a set of electronic data, including both electronic data stored in a file and electronic data received over a network. An electronic document does not necessarily correspond to a file and may be stored in volatile memory, a persistent storage device, and the like. A document may be stored in a portion of a file that holds other documents, in a single file dedicated to the document in question, or in a set of coordinated files.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other implementations may be within the scope of the following claims.

The invention claimed is:

1. A computer-implemented method comprising:
accessing source code that, includes metadata identifying two or more functionally-equivalent implementations of a function defined within the source code;
automatically generating multiple versions of diversified source code, each version of the diversified source code being distinct from but functionally equivalent to the accessed source code, wherein automatically generating multiple versions of the diversified source code comprises:
identifying locations in the source code where different types of diversification operations can be performed,
selecting different permutations of the different types of diversification operations and different identified locations for each of the multiple versions of the diversified code,
performing the selected types of diversified operations at the selected locations in each of the multiple versions of the diversified code, identifying the functionally-equivalent implementations of the function defined within the source code by referencing the metadata, inserting one of the identified functionally-equivalent implementations of the function into each of the multiple versions of diversified source code, wherein a different one of tile functionally-equivalent implementations of the function is inserted in each of the multiple versions, validating an equivalence of results of each of the inserted functions in the multiple versions of the diversified source code, and providing the multiple versions of the diversified source code;

compiling each of the multiple versions of diversified source code into multiple versions of diversified machine code, independent of automatically generating the multiple versions of diversified source code; and further diversifying each of the multiple versions of diversified machine code by performing different diversification operations on each of the multiple machine versions of diversified machine code.

2. A memory device encoded with a computer program, the computer program comprising instructions that, when executed, operate to cause a computer to perform operations comprising:

accessing source code that includes metadata identifying two or more functionally-equivalent implementations of a function defined within the source code;

automatically generating multiple versions of diversified source code, each version of the diversified source code being distinct from but functionally equivalent to the accessed source code, wherein automatically generating multiple versions of diversified source code comprises:

identifying locations in the source code where different types of diversification operations can be performed, selecting different permutations of the different types of diversification operations and different identified locations for each of the multiple versions of the diversified code, performing the selected types of diversified operations at the selected locations in each of the multiple versions of the diversified code, identifying the functionally-equivalent implementations of the function defined within the source code by referencing the metadata;

inserting one of the identified functionally-equivalent implementations of the function into each of the multiple versions of diversified source code, wherein a different one of the functionally-equivalent implementations of the function is inserted in each of the multiple versions;

validating an equivalence of results of each of the inserted functions in the multiple versions of the diversified source code; and providing the multiple versions of the diversified source code;

compiling each of the multiple versions of diversified source code into multiple versions of diversified machine code, independent of automatically generating the multiple versions of diversified source code; and further diversifying each of the multiple versions of diversified machine code by performing different diversification operations on each of the multiple machine versions of diversified machine code.

3. The memory device of claim 2, wherein the two .or more functionally-equivalent implementations have code-level variations but are semantically identical to one another.

4. The memory device of claim 2, wherein providing the multiple versions of diversified source code comprises providing different versions of the diversified source code to different users.

5. The memory device of claim 2, wherein inserting one of the identified functionally-equivalent implementations comprises selecting one of the functionally-equivalent implementations based on a random function.

6. The memory device of claim 2, wherein automatically generating multiple versions of the diversified source code further comprises storing information indicating which of the functionally-equivalent implementations is inserted into each of the multiple versions of the diversified source code.

7. The memory device of claim 6, comprising patching each of the multiple versions of the diversified source code by referencing the stored information indicating which of the functionally-equivalent implementations is inserted into each of the multiple versions of the diversified source code.

8. The memory device of claim 7, wherein patching each of the multiple versions. of the diversified source code comprises, automatically generating different versions of the patch according to the stored information indicating which of the functionally-equivalent implementations was inserted into each of the multiple versions of the diversified source code.

9. The memory device of claim 2, wherein automatically generating multiple versions of the diversified source code comprises inserting a no-operation instruction in the source code at different locations in each of the multiple versions of diversified source code.

10. The memory device of claim 9, wherein inserting a no-operation instruction further comprises:

identifying an incorrect jump destinations resulting from inserting the no-operation instruction; and changing the incorrect jump destinations to a correct jump destinations that accounts for the insertion of the no-operation instruction.

11. The memory device of claim 2, wherein providing the multiple versions of diversified source code comprises:

forming multiple versions of binary code by compiling each of the multiple versions of diversified source code; and distributing each of the multiple versions of binary code and a binary-code diversifier to different end-user computers, wherein the. binary code diversifier is configured to perform diversification operations on one of the multiple versions of binary code when executed on the end user computer.

12. The memory device of claim 2, wherein the different types of diversification operations include renaming of source code, insertion of redundancy, inserting one, of the identified functionally-equivalent implementations, or insertion of no-operation instructions.

13. The memory device of claim 2, wherein the computer program comprises instructions that, when executed, operate to cause the computer to perform operations further comprising:

compiling each of the multiple versions of diversified source code by forming a parse tree for each of the multiple versions of diversified source code;

for each parse tree, generating multiple diverse versions of the parse tree that are functionally equivalent to one another; and generating multiple diverse versions of machine code based on the multiple diverse versions of the parse trees.

14. The memory device of claim 13, wherein the multiple diverse versions of machine code are generated at substantially the same time.

15. The memory device of claim 13, wherein the multiple diverse versions of machine code are generated one at a time.

16. The memory device of claim 2, wherein the computer program comprises instructions that, when executed, operate to cause the computer to perform operations further comprising:
providing the multiple versions of the diversified source code serially; and
compiling each of the multiple versions of the diversified source code independent of automatically generating the multiple versions of diversified source code, wherein some of the multiple versions of diversified source code are compiled while other of the multiple versions of diversified source code are being generated.

17. The memory device of claim 2, wherein automatically generating the multiple versions of diversified source code does not substantially affect optimization of the multiple versions of diversified source code relative to the source code.

18. A system comprising:
one or more computers; and
a memory device coupled to the one or more computers having instructions stored thereon which, when executed by the one or more computers, causes the one or more computers to perform operations comprising:
accessing source code that includes metadata identifying two or more functionally-equivalent implementations of a function defined within the source code;
automatically generating multiple versions of diversified source code, each version of the diversified source code being distinct from but functionally equivalent to the accessed source code, wherein automatically generating multiple versions of the diversified source code comprises:
identifying locations in the source code where different types of diversification operations can be performed,
selecting different permutations of the different types of diversification operations and different identified locations for each of the multiple versions of the diversified code,
performing the selected types of diversified operations at the selected locations in each of the multiple versions of the diversified code,
identifying the functionally-equivalent implementations of the function defined within the source code by referencing the metadata;
inserting one of the identified functionally-equivalent implementations of the function into each of the multiple versions of diversified source code, wherein a different one of the functionally-equivalent implementations of the function is inserted in each of the multiple versions;
validating an equivalence of results of each of the inserted functionally-equivalent implementations in the multiple versions of the diversified source code; and
providing the multiple versions of the diversified source code;
compiling each of the multiple versions of diversified source code into multiple versions of diversified machine code, independent of automatically generating the multiple versions of diversified source code; and
further diversifying each of the multiple versions of diversified machine code by performing different diversification operations on each of the multiple machine versions of diversified machine code.

* * * * *